US005104554A

United States Patent [19]
Dempsey

[11] Patent Number: 5,104,554
[45] Date of Patent: Apr. 14, 1992

[54] REMOVING RADON BY DOWNHOLE SPARGING OF AIR

[75] Inventor: John C. Dempsey, Frederick, Md.

[73] Assignee: Aqua-Rid, Inc., Southampton, Pa.

[21] Appl. No.: 627,760

[22] Filed: Dec. 14, 1990

[51] Int. Cl.$^5$ .............................................. C02F 1/74
[52] U.S. Cl. ................................... 210/747; 210/750; 210/170; 210/221.2; 210/758; 261/119.1; 261/121.1; 261/123; 261/77; 261/DIG. 19; 55/53; 55/196
[58] Field of Search ............... 210/747, 750, 218, 758, 210/916, 170, 220, 221.2, 221.1; 166/112; 261/119.1, 123, 77, DIG. 19, 121.1; 55/53, 190; 203/4

[56] References Cited

U.S. PATENT DOCUMENTS

| | | | |
|---|---|---|---|
| 4,290,979 | 9/1981 | Sugiura | 210/221.2 |
| 4,478,765 | 10/1984 | Tubbs | 210/170 |
| 4,491,549 | 1/1985 | Fischer et al. | 210/221.2 |
| 4,526,692 | 7/1985 | Yohe et al. | 210/747 |
| 4,543,186 | 9/1985 | Weisenbarger et al. | 210/221.2 |
| 4,582,610 | 4/1986 | Baker | 210/747 |
| 4,608,163 | 8/1986 | Yohe et al. | 210/170 |
| 4,707,308 | 11/1987 | Ryall | 210/221.2 |
| 4,780,217 | 10/1988 | Petersen | 210/221.2 |
| 4,892,664 | 1/1990 | Miller | 55/53 |
| 4,943,305 | 7/1990 | Bernhardt | 55/196 |

Primary Examiner—Stanley S. Silverman
Assistant Examiner—Neil M. McCarthy
Attorney, Agent, or Firm—John R. Ewbank

[57] ABSTRACT

Substantially the last traces of radon are removed from typical well water at subterranean temperatures prior to significant pressurization of the water by displacement of the radon by a stream of compressed air, such radon mixing with the air vented from the system. Other objectionable gases in well water are removed concurrently with radon.

5 Claims, 1 Drawing Sheet

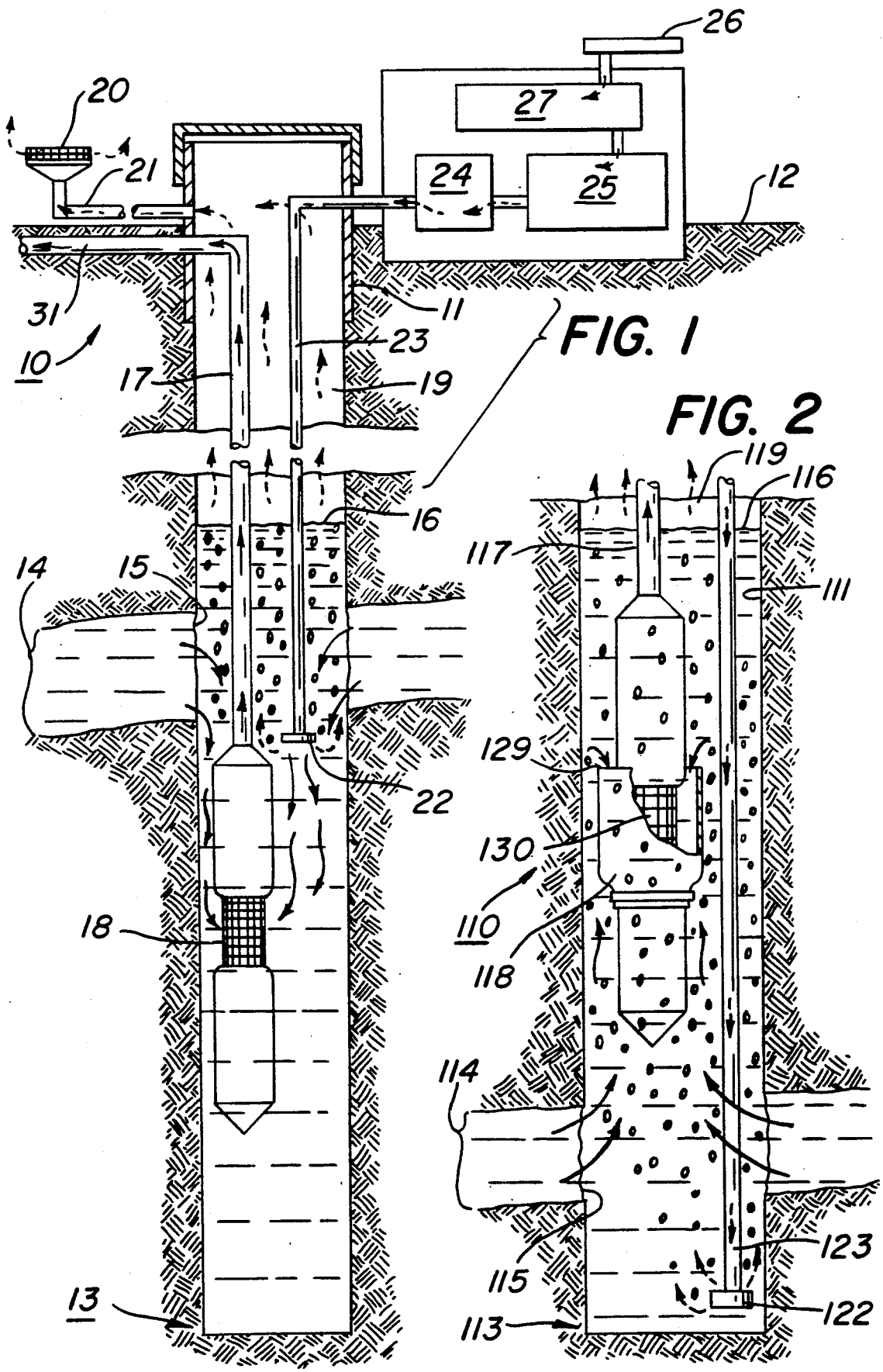

REMOVING RADON BY DOWNHOLE SPARGING OF AIR

BACKGROUND

1. Field of Invention

This invention relates to degassing well water by displacing offensive gases by treatment with a stream of compressed air. The basic problem has existed for thousands of years. In recent years there has been recognition that subterranean water sources sometimes contained dissolved radon, prompting analytical procedures for measuring the radon content of water. The molar concentration of dangerous levels of radon are significantly smaller than the tolerable, innocuous molar concentrations of offensive gases such as sulfur dioxide, so that the problem of removing radon from water can be said to begin with concentrations smaller than are acceptable end results for other offensive gases. Some health authorities have indicated that other than inhaling smoke, radon is the second most abundant cause of lung cancer, which kills millions globally every decade. Because of the need for providing assurances that the radon concentration is so remarkably small, de-radonizing water is quite distinguishable from conventional degassing of water.

2. Prior Art

Therapeutic spas have been developed in locations where the natural water from springs or well contained carbon dioxide and/or other gaseous components. Hydrogen sulfide, sulfur dioxide, oxides of nitrogen, methyl mercaptan, and/or other offensive gases have sometimes been detected in spring water, well water, and/or other natural sources for a water supply. Measurements of the radon content of natural water have been made for decades, particularly by mining geologists searching for deposits containing commercial concentrations of uranium. For several years, some householders seeking an analysis of their domestic well water have had the option of paying extra for a report on the radon content. Because helium is extremely insoluble in water, and because radon is also an inert gas, one might expect radon to be extremely insoluble. Water solubilities of gases are approximately inversely proportional to Henry's constant, so that a smaller Henry's constant indicates greater solubility and a larger Henry's constant indicates less solubility of the gas in water. Such constants are usually expressed as a number times 10 to the minus 7. At page 1398-9 of the 30th Edition of the Handbook of Chemistry and Physics, the significant figures for such Henry's constants at 10 degrees Centigrade were: helium, 10.5; radon 0.286; carbon dioxide, 0.0788; nitrous oxide 0.108; and ethylene 0.552.

Removing radon from the atmosphere of a home has become a retrofitting skill which has attractive cost-benefit ratios under appropriate conditions, notwithstanding the fact that some homes are so located that the normal radon concentration may be either too small or too great to justify the costly renovations required for modifying the exposure to radon.

Well water can contain dissolved radon. Any mammal ingesting water containing radon is risking that such radon may initiate, not merely lung cancer, but any of dozens of other kinds of cancer and illness. Public health authorities recognize that the cost-effectiveness of measuring the radon content of every domestic well is questionable. However, those wells employed for supplying water to hundreds of homes can be monitored for banning the further use of wells contaminated with dangerous concentrations of radon.

New standards have recently been announced for the radon content of public water systems. Hence, consumers are scheduled to be protected from the cancer hazards attributable to radon in public water supplies. There has been widespread recognition that removing radon was significantly more difficult than removing conventional objectionable gases. The effort to remove an objectionable gas from a liquid has sometimes been called "degassing" notwithstanding the fact that the process involved the substituting air for the objectionable gas dissolved in the liquid.

Although abandonment of a well having troublesome amounts of radon is among the contemplated responses to the discovery of radon concentrations above the established standards, various procedures are available for decreasing the radon concentration. Heretofore there have been proposals for the use of vacuum and/or reduced pressure for degassing water supplies, and relatively bulky equipment has been proposed for such processing. Other systems have modified the pressurized water system to depressurize the water for spraying through a flowing air stream so that the objectionable gas has been withdrawn as the water was fully aerated at ambient pressure, and the thus aerated water has been then repressurized for use in the water supply system.

Although some aspects of small water supply systems for a household and large water supply systems for public distribution have been similar, the technologies for removing objectionable gases from the two types of systems have developed as quite distinct technologies. One standard method for degassing a municipal water supply has involved the spraying of water downwardly in a tower in which the upflowing air stream carried away the objectionable gases. After such degassing, the water required repressurization. The capital and operating costs for such standard degassing system prompted descriptions of dozens of alternative proposals, most of which proved sufficiently unsatisfactory that the spraying into a counter-flowing air stream remained a standard procedure. Some of these above-ground treatments have required depressurizing the water, and then bubbling compressed air through such depressurized water, venting the gaseous mixture of radon and air stream resulting from such treatment, and then repressurizing the degassed water. If the air which is compressed contains bacteria, such bubbling of compressed air can contaminate the water. If the bubbling of the compressed air through the water is in a building, then some of the radon removed from the water might leak into the building instead of being adequately vented to the outdoors.

Water derived from a subterranean source has sometimes been de-radonized by treatment with activated charcoal. However, any activated charcoal containing significant amounts of radon and/or its decomposition products is a hazordous waste which requires costly disposal.

SUMMARY OF THE INVENTION

In accordance with the present invention, a water well is modified to provide a tube directing compressed air into the subterranean water prior to the flow of such water to the inlet zone for the pump. Such well sometimes comprises a casing and an upflow pipe spaced from the casing to provide a gas zone within at least the upper portion of such casing. This permits practicing the method of aerating the subterranean water prior to its flow to the inlet zone for the pump, whereby dissolved radon is displaced by air, and whereby the previously dissolved radon is directed upwardly through the gas zone in the casing to an outdoor vent. Such vent is positioned remotely from the air intake for the air compressing system, thus minimizing recycling of the radon. Whether the water inlet to the pump is above or below the level of the geological source of the water, the compressed air is injected at a still lower level. If necessary, the water inlet for the pump can be shielded so that water flowing toward such water-inlet flows downwardly for a distance effective in clarifying such water so that it is substantially free from foam or large air bubbles when entering said water inlet.

DESCRIPTION OF DRAWINGS

FIG. 1 is a schematic sectional presentation of a well system featuring the invention.

FIG. 2 is a sectional schematic presentation of a modification of FIG. 1 for well systems in which there is a reliable significant height of the normal water level above the geological source of water, and in which the water inlet is at a higher level than the geological source.

DESCRIPTION OF PREFERRED EMBODIMENTS

As shown in FIG. 1, a well system 10 comprises a well wall 11 extending from near the earth's surface, shown schematically as 12, to an appropriate subterranean zone corresponding to the general level of the bottom of the well, or well bottom level 13. Although designated as a "well wall" a metal liner called a casing is generally employed except when there are sufficiently stable rock walls. At the level where the geological formation 14 provides a significant, and usually principal, source of water flow, the well casing can be either omitted or there can be a plurality of openings 15 through which the subterranean water enters the well. In some wells, the water pressure from the geological source can support several feet of water, so that the normal level 16 of the water in the well is significantly above said geological formation 14. An upflow pipe 17 transmits water from a level near said geological formation 14 to near the earth's surface 12. At least a portion of said upflow pipe is spaced from said well wall.

Many varieties of pumps, including submersible pumps, jet pumps, intermittent piston action pumps, etc. share in common the phenomena of transducing energy for maintaining the water flow in said upflow pipe 17 during appropriate intervals. A water inlet zone 18 for the pump directs the subterranean water into said upflow pipe 17 during said appropriate intervals.

As shown in FIG. 1, said water inlet zone 18 is below said geological source 14. It should be noted that the well system includes a gas zone 19 in that portion of said well casing above said normal water level 16. A vent 20 permits the discharge of gas from said gas zone 19 whenever the pressure at said vent 20 exceeds ambient pressure. Such escaping gas flows from said gas zone 19 to said vent 20 through a gas exit tube 21. The thus far described well system is believed to be a generic description of the approximate arrangements of components for a significant portion of wells in the USA in recent decades.

In accordance with the present invention, a sparger 22, such as a fritted glass disk, through which compressed air is directed for injecting bubbles of air into the well water, is positioned so that water flowing downwardly from said geological source 14 to said water inlet 18 is adequately aerated. In FIG. 1, such sparger 22 is positioned at a level above said water inlet zone 18 but below the level of said geological source 14. Hence, any water flowing downwardly from said geological source 14 toward said water inlet zone 18 is effectively de-radonized by the upflowing bubbles of air from sparger 22. To the extent that water from geological formation 14 contains radon [or other objectionable gases] air displaces it so that the water flowing below said sparger 22 is substantially free from radon or other objectionable gases, and contains no dissolved gases except those gases in the compressed air injected through said sparger 22.

Because the removal of radon is accomplished in a subterranean zone having a reasonably stable temperature [thus being freeze-proof] and ambient pressure, and avoids the depressurization and repressurization of some conventional systems, and because it avoids the build up of hazardous waste [e.g. activated carbon after prolonged adsorption of radon gas] this system is both much simpler and more effective than prior art approaches to removing radon from well water.

A compressed air supply line 23 directs compressed air to said sparger 22. An optional compressed air tank 24 can provide storage for air pressurized by compressor 25. A screen 26 and filter 27 [desirably a barrier to bacteria] clean the air going to compressor 25, so that the compressed air going from tank 24 to supply line 23 to sparger 22 is clean compressed air. Said screen 26 is located remotely, that is, more than ten feet distant, from said vent 20 to minimize the possibility of radon being recycled through the system.

In the operation of the radon removal system of FIG. 1, air enters screen 26, and flows through bacteria-removing filter 27, and is pressurized by compressor 25, stored in tank 24, and flows thru supply line 23 to sparger 22. The compressed air bubbles produced at sparger 22 flow upwardly through the downflowing water, displacing the radon. Thus all of the radon content of the water entering from geological formation 14 shifts to the upflowing gas bubbles, and enters said gas zone 20, thence through gas exit tube 21 to vent 20. After the water has flowed downwardly past said sparger 22, it flows through said water inlet zone 18 and into upflow pipe 17. It is convenient to hypothesize a down-hole pump of the submersible type, but substantially any of the pump systems which have been used for domestic and municipal wells can be used. The water, after being freed from radon, flows downwardly through said water inlet zone 18, into the upflow pipe 17, and to the water output line 31.

In FIG. 2, the stable normal level 116 of the water in the well system 110 is significantly higher than the geological formation 114. A water inlet zone 118 of a down-hole submersible pump system is positioned above said geological formation 114. It should be noted that sparger 122 is positioned below said geological formation 114. The flow of the bubbles upwardly toward gas zone 119 is much faster than the rate of flow of the water upwardly toward said water inlet zone 118. Thus adequate removal of radon gas is achieved with such concurrent flow instead of the counterflow arrangement of FIG. 1.

If many gas bubbles or foam were to enter the pumping system, various problems might arise. Accordingly, a shield 129 is positioned to provide an annular clarification zone 130 in which the water flows downwardly while losing all bubbles. Such annular clarification zone is appropriately about a foot high and about one inch thick. In other respects, FIG. 2 resembles FIG. 1. Thus in well system 110, a well wall 111 extends upwardly from well bottom 113. A geological formation 114 has a zone 115 from which the water exits into the well system, through the water inlet zone 118, and into the upflow pipe 117. Above the normal water level 116, the gas zone 119 is a part of the flow path for the air from sparger 122 for venting the radon flushed from the subterranean water.

Because the present invention features a down-hole sparger, the radon in the water from the geological source is displaced into the air stream vented to the atmosphere.

Various modifications of such preferred embodiments are plausible without departing from the scope of the appended claims.

GLOSSARY 10 well system
11 well wall
12 level near earth's surface
13 level near bottom of well
14 level of geological source of water
15 zone of water exiting from geological source
16 level of water in well
17 upflow pipe
18 water inlet zone
19 gas zone above water level
20 vent from gas zone
21 gas exit tube
22 sparger
23 compressed air line
24 compressed air tank
25 compressor
26 screen
27 filter
31 water output line

FIG. 2

110 well system
111 well wall
112 level near earth's surface
113 level near bottom of well
114 level of geological source of water
115 zone of water exiting from geological source
116 level of water in well
117 upflow pipe
118 water inlet zone
119 gas zone above water level
120 vent from gas zone
121 gas exit tube
122 sparger
123 compressed air line
129 shield
130 annular clarification zone
131 water output line

The invention claimed is:

1. A method of decreasing the content of objectionable gases in water flowing through an outlet pipe in a pressurized water supply system comprising a geological formation directing water into a well for maintaining a predetermined water level in a subterranean zone, a well wall extending downwardly from near the earth's surface to said subterranean zone, an upflow pipe through which water flows from a submerged water inlet to near the earth's surface, at least a portion of said upflow pipe being spaced from said well wall;

a gas zone confined laterally by said well wall, and a pump directing pressurized water from said submerged inlet through said upflow pipe to said outlet pipe;

said method comprising injecting compressed air into the well water at a level near the level at which said geological formation directs water into said well such that said compressed air displaces objectionable gases from water directed from said geological formation prior to said water directed from said geological formation entering said submerged water inlet;

directing the objectionable gases and air upwardly through said gas zone;

directing said mixture of objectionable gases and air from said gas zone through a vent to the atmosphere, said compressed air withdrawn from an atmospheric source at a location remote from said vent for minimizing recycling of said objectionable gases back into said compressed air; and, withdrawing through said outlet pipe pressurized water substantially free from objectionable gases.

2. The method of claim 1 wherein said objectionable gas is radon.

3. The method of claim 1 wherein said water inlet is positioned below the level of the geological formation and the injecting of compressed air occurs above the level of the water inlet.

4. The method of claim 1 in which said water inlet is positioned above the level of the geological formation and the injecting of the compressed air occurs below the level of the geological formation so that said compressed air and objectionable gases pass upwardly toward said water inlet which is provided with an annular clarification and de-bubbling zone which prevent said compressed air and objectionable gases from entering said water inlet.

5. An apparatus for decreasing the content of objectionable gases in water flowing through an outlet pipe in a pressurized water supply comprising a geological formation directing water into a well for maintaining a predetermined water level in a subterranean zone, a well wall extending downwardly from near the earth's surface to said subterranean zone, an upflow pipe through which water flows from a submerged water inlet to near the earth's surface, at least a portion of said upflow pipe being spaced from said well wall;

a gas zone confined laterally by said well wall, and a pump directing pressurized water from said submerged inlet through said upflow pipe to said outlet pipe, said apparatus comprising the combination of:

an air compressor mounted near the earth's surface and withdrawing atmospheric air to provide a source of compressed air;

a tube directing said compressed air to a zone submerged beneath the water in said subterranean zone;

a sparger connected to said tube for directing compressed air into water flowing from said geological formation toward said submerged inlet, whereby objectionable gases in the water directed from said geological formation are displaced by compressed air exiting from said sparger prior to said water directed from said geological formation entering said submerged water inlet, and the objectionable gases and air are directed upwardly through said gas zone; and, a vent for discharging the objectionable gases and compressed air from said gas zone to the atmosphere, said vent being positioned remotely from said source of atmospheric air for the the air compressor such that recycling of said objectionable gases back into said compressed air in minimized.

* * * * *